UNITED STATES PATENT OFFICE.

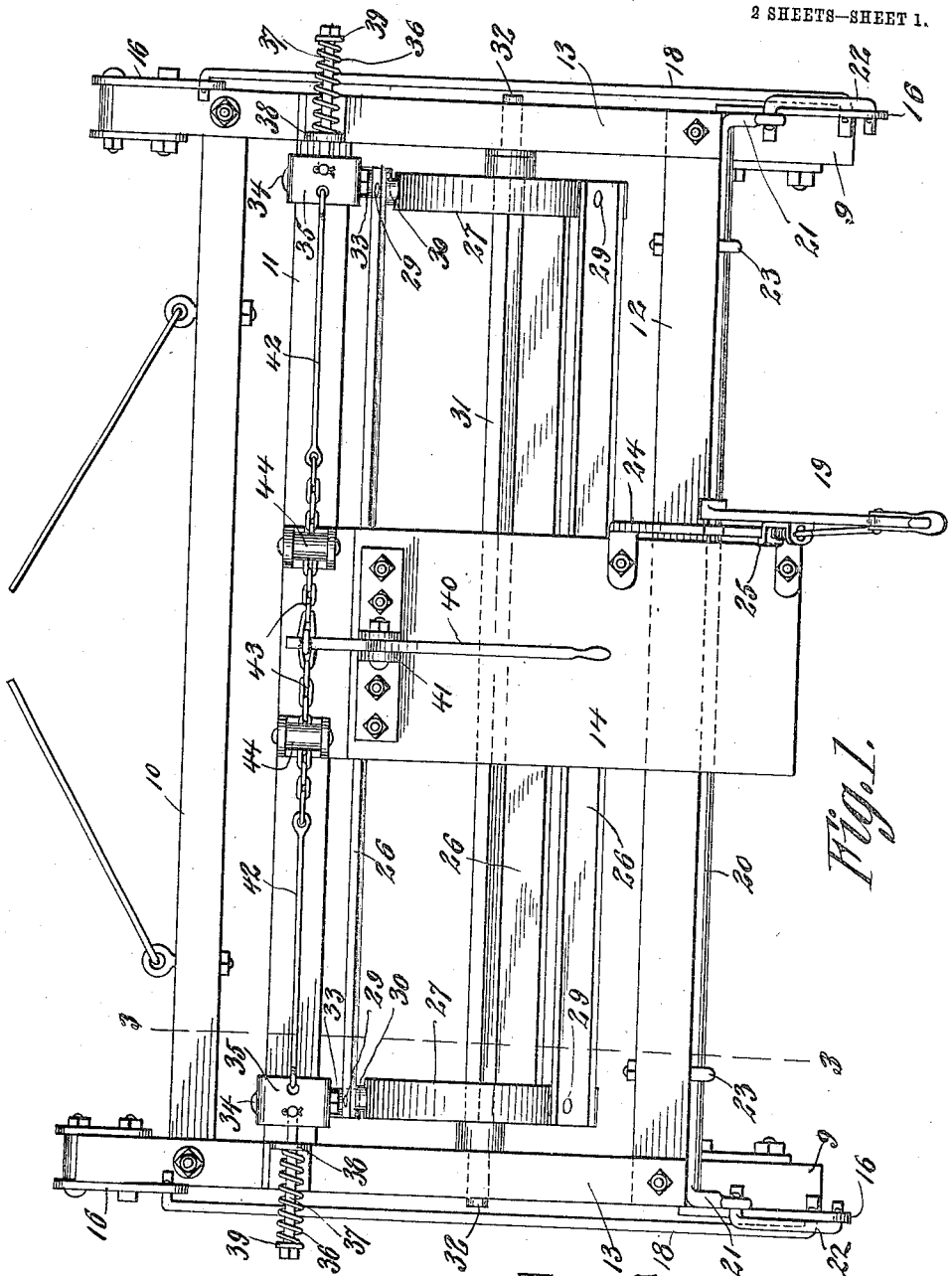

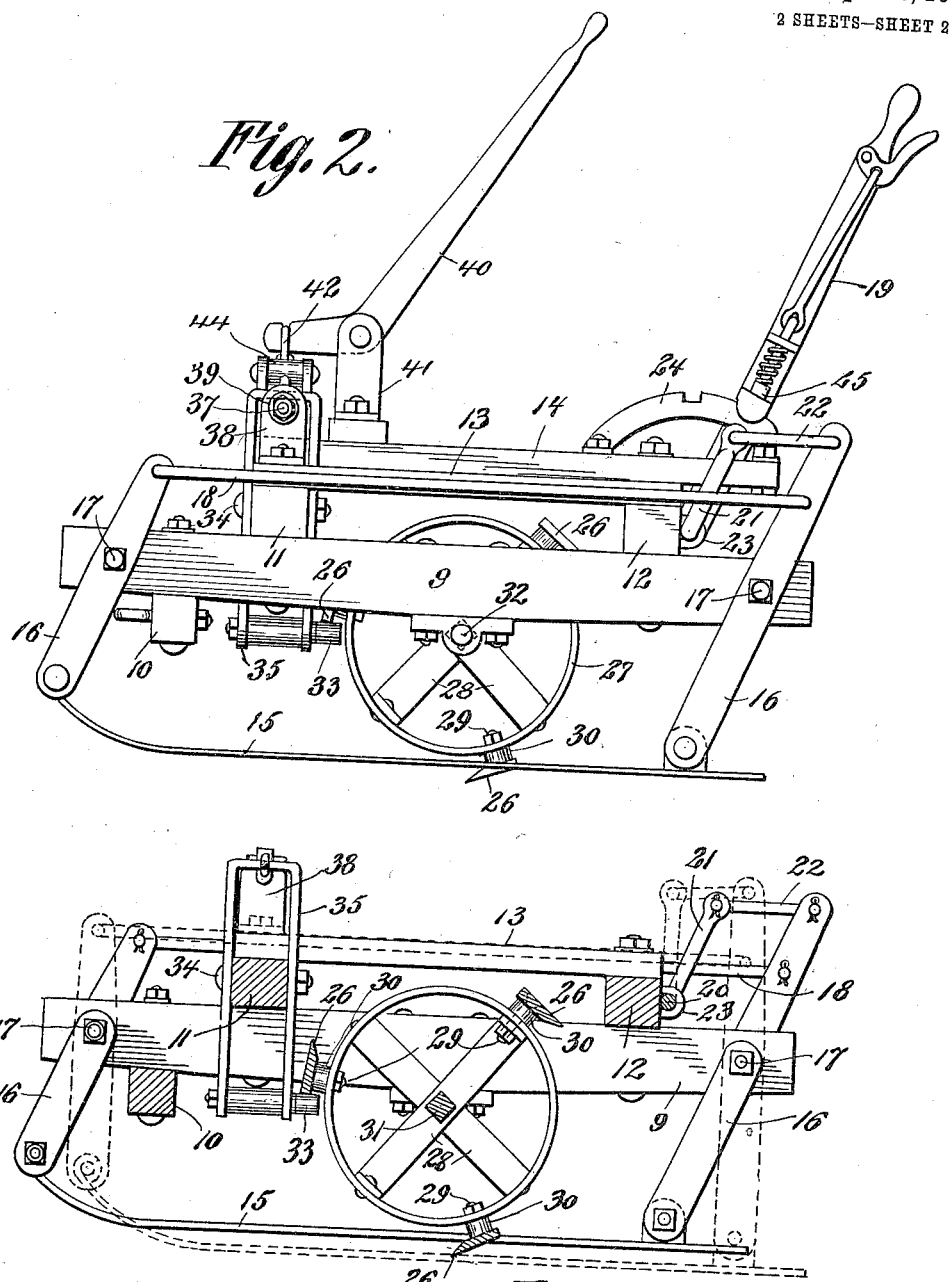

JAMES A. TALBOT, OF WALLA WALLA, WASHINGTON.

WEED-CUTTER.

1,111,108.  Specification of Letters Patent.  Patented Sept. 22, 1914.

Application filed April 23, 1914. Serial No. 833,924.

*To all whom it may concern:*

Be it known that I, JAMES A. TALBOT, a citizen of the United States, residing at Walla Walla, in the county of Walla Walla and State of Washington, have invented certain new and useful Improvements in Weed-Cutters, of which the following is a specification.

This invention relates to machines for cutting weeds from farm lands by means of a cutter which runs below the surface of the ground to operate on the roots of the weeds.

The invention has for its object to provide a novel and improved weed cutter of the kind stated having a plurality of cutter blades which may be placed in operative position, one after the other, so that, if a cutting blade becomes clogged, it can be swung upward out of the ground, whereupon it clears itself and at the same time another cutting blade swings down into operative position.

The invention also has for its object to provide simple and easily operated means for controlling the cutting blades.

A further object of the invention is to provide novel and improved means for elevating the entire cutting mechanism above the surface of the ground into inoperative position, so that the machine can be easily transported to and from the field, and may also be run over a field without danger of damaging growing crops.

These objects are attained by means of a combination and arrangement of parts to be hereinafter described and claimed, reference being had to the accompanying drawings in which—

Figure 1 is a plan view of the machine; Fig. 2 is a side elevation thereof, and Fig. 3 is a longitudinal section on the line 3—3 of Fig. 1.

Referring specifically to the drawings, the supporting frame of the machine comprises laterally spaced side bars 9 connected in front by a bottom cross-bar 10, and on top by front and rear cross-bars 11 and 12, respectively, the ends of which are connected by cross-bars 13. The bars 11 and 13, midway between the ends thereof, support a platform 14. The draft animals are connected to the bar 10.

The supporting frame is supported above the ground by runners 15 which are connected at their front and rear ends by vertical links 16 to the side bars 9, said links being pivoted to the side bars as indicated at 17 to swing in a vertical plane. The links project a short distance above the side bars and their upper ends are connected by rods 18, which hold the links in parallel relation and cause them to swing together. The link connection is provided for the purpose of raising and lowering the supporting frame, in order to elevate and lower the cutting blades to be presently described. It will be evident that when the links are swung to perpendicular position, the supporting frame is elevated relative to the runners, and upon swinging the links away from the perpendicular, the supporting frame lowers. The links are operated by a hand lever 19 connected to a rock shaft 20 having crank arms 21 at its ends which are connected by rods 22 to the upper ends of the rear links 16. The rear cross-bar 12 has suitable bearings 23 for the rock shaft, and on the platform 14 is mounted a toothed sector 24 engageable by a spring latch 25 carried by the lever 19 for the purpose of locking the same to hold the supporting frame in the desired position, in which it has been placed.

The cutting mechanism comprises a circular series of longitudinal blades 26 carried by a rotatable support which is mounted between the side bars 9. The support comprises end and intermediate circular rims 27 having spokes 28, the cutting blades being mounted on the outer periphery of the rims in spaced relation therewith, and secured to said rims by bolts or other suitable fasteners 29, spacing sleeves 30 being interposed between the blades and the rims. The support is carried by a shaft 31 which is squared and passes through the center of the spokes. The ends of the shaft have journals 32 which are supported in bearings in the side bars 9.

As only one of the blades 26 is to operate at one time, means are provided for locking the rotatable support. These means are abutments 33 which are adapted to be placed in the path of a blade. The abutments are so located, and the blades are so spaced, that when one of the blades comes against the abutments, another blade is in operative position. The abutments are located at the front portion of the machine and they are engageable by the back edge of the blades. On the front cross-bar 11 are pivoted, as indicated at 34, hangers 35 which carry the abutments 33. The hangers swing transversely of the machine and the abutments therefore move correspondingly. The hangers are positioned near the ends of the cross-bar 11 and they are adapted to be swung outward toward the side bars 9 to enable the cutting blades to clear the abutments. The hangers are normally positioned to locate the abutments in the path of a cutting blade, and they are held in this position by springs 36 coiled around stems 37 connected to the upper ends of the hangers and passing slidably through brackets 38 mounted on the bars 13, the springs being located between said brackets and abutments 39 on the outer ends of the stems.

In order to swing the hangers 35 to take the abutments 33 out of the path of the cutting blades 26, said hangers are connected to a hand lever 40 fulcrumed on a bracket 41 mounted on the platform 14. The connection is made by rods 42 which are connected to the hangers and extend inward therefrom, and have chains 43 connected to their inner ends, which chains are connected to the hand lever after passing over guide pulleys 44 mounted on the platform. Upon swinging the hand lever downward the hangers swing in a direction to take the abutments 33 out of the path of the cutting blades.

In operation, the supporting frame is lowered so that one of the cutting blades 26 may run below the surface of the ground when the machine is drawn forward. If the blade becomes clogged, the lever 40 is swung down to carry the abutments 33 away from the blade which they engage. The support for the blades is now free to turn, whereupon the clogged blade swings back out of the ground and thus clears itself, and the next blade lowers into operative position. The hand lever 40 is also released to restore the abutments to holding position, the rotation of the cutting mechanism then being stopped by the next blade coming against the abutment.

The preferred embodiment of the invention has been shown, but it will be evident that various changes and modifications in the structural details may be made without departure from the spirit and scope of the invention as hereinafter claimed.

I claim:

1. A weed cutter comprising a supporting frame, a circular series of cutting blades, a rotatable support for said blades carried by the supporting frame, said blades successively coming into operative position when the support rotates, a pivoted hanger, an abutment carried by the hanger, said abutment being in the path of the blades and locking the support against rotation when engaged by a blade, at which time another blade of the series is in operative position, a stem extending from the hanger and having an abutment, a spring coiled around the stem and having one end engaging the abutment thereof, an abutment for the other end of the spring, a hand lever carried by the supporting frame, and a flexible connection between the hand lever and the hanger.

2. A weed cutter comprising a supporting frame, a circular series of cutting blades, a rotatable support for said blades carried by the supporting frame, said blades successively coming into operative position when the support rotates, hangers pivoted on the supporting frame on opposite sides thereof to swing transversely of said frame, abutments carried by the hangers, said abutments being in the path of the blades adjacent to the ends thereof, and locking the support against rotation when engaged by a blade, at which time another blade of the series is in operative position, and means for swinging the hangers to withdraw the abutments to allow the support to rotate to swing the last-mentioned blade out of operative position and to bring another blade into operative position.

In testimony whereof I affix my signature in presence of two witnesses.

JAMES A. TALBOT.

Witnesses:
 CHARLES S. BUFFUM,
 R. L. TALBOT.

---

Copies of this patent may be obtained for five cents each, by addressing the "Commissioner of Patents, Washington, D. C."